March 10, 1942. W. S. EDWARDS 2,275,746
BEVERAGE BREWER
Filed March 30, 1939
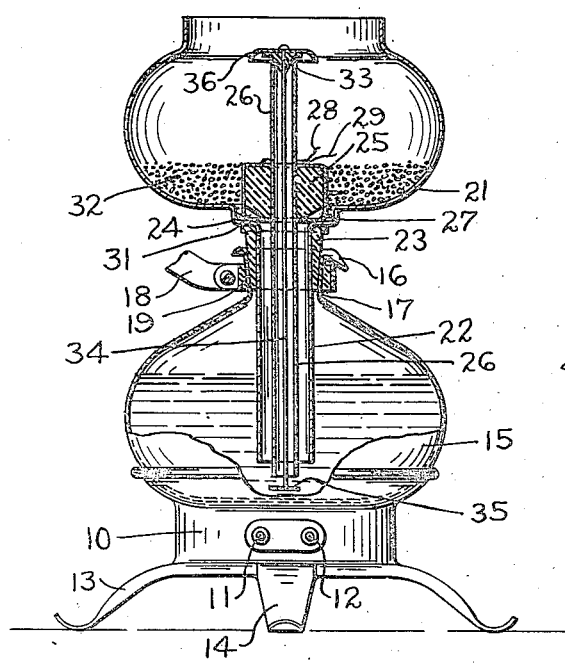
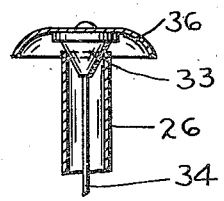
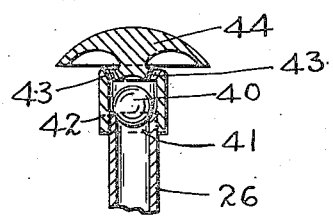
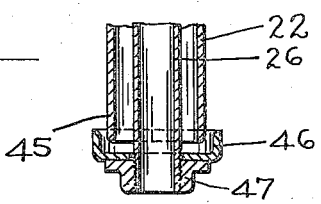
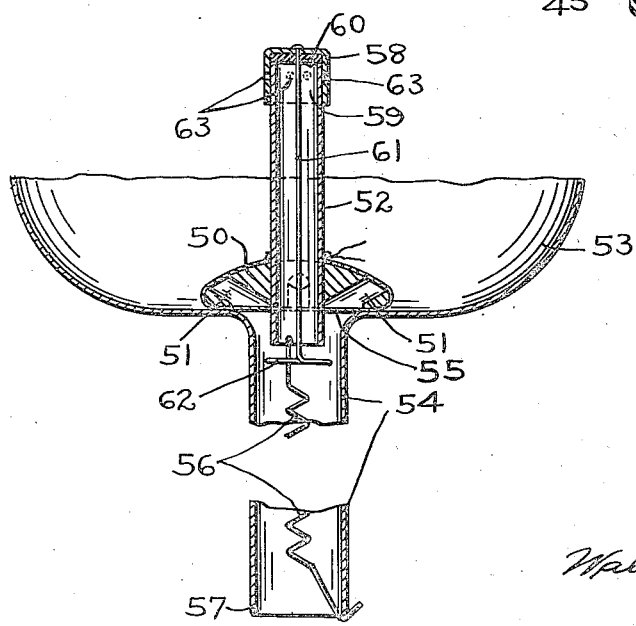
INVENTOR
Walter S. Edwards.

Patented Mar. 10, 1942

2,275,746

UNITED STATES PATENT OFFICE 2,275,746

BEVERAGE BREWER

Walter S. Edwards, New Haven, Conn., assignor to The Silex Company, Hartford, Conn.

Application March 30, 1939, Serial No. 264,928

2 Claims. (Cl. 53—3)

This invention relates to vacuum type beverage brewers and more particularly to improvements whereby the type of beverage brewers which have separable upper and lower containers will be rendered more efficient and their operation improved.

It has been found necessary to stir the loose granular ingredients in the upper container, of beverage brewers of the above nature, with the liquid forced upwardly thereinto from the lower container, in order to thoroughly mix them and insure that a maximum amount of flavor and essential oils will be absorbed by the liquid. This is an inconvenient operation and subsequently brewed beverages are often not the same in strength of flavor, even though the same proportions of liquid and ingredients are used. It has also been found that, to insure obtaining the desired beverage strength, more ingredients are required when the mixture is not stirred.

Beverage makers have been provided wherein the liquid is directed to a point above the ingredients and then allowed to seep through the same but these have been found to be expensive to manufacture, complicated in construction, and inconvenient to use and to disassemble for cleaning.

One object of this invention is to provide an improved form of beverage brewer having separable upper and lower containers.

Another object is to provide, in a beverage brewer of the above nature, improved means to more thoroughly mix the unconfined loose ingredients in the upper container with the liquid forced upwardly from the lower container and thereby obviate the necessity of stirring the same or any inconvenience in its use.

Still another object is to provide, in a beverage brewer of the above type, readily removable means to hold a strainer member in place between the separable upper and lower containers; said means being adapted to direct a portion of the liquid, which is forced upwardly from the lower container into the upper container, above the ingredients therein to cause agitation of the same with the liquid in said upper container.

A further object is to provide, in a vacuum type beverage brewer having a liquid receiving lower container and an upper loose ingredient receiving container separably connectable to the lower container and in communication therewith by means of a tubular extension, a readily removable tubular filter member holding unit having means extending upwardly in the upper container to a point above the ingredients therein so as to direct a portion of the upwardly flowing liquid from the lower container to above and over the ingredients, while permitting another portion of the upwardly flowing liquid to pass through the filter member and into the upper container from the bottom thereof through said tubular extension.

A further object is to provide an improved vacuum type beverage brewer of the above nature which will be relatively inexpensive to manufacture, simple in construction, compact, of pleasing appearance, and very efficient and durable in use.

With these and other objects in view, which will appear as the description proceeds, there has been illustrated in the accompanying drawing several forms in which the invention may be conveniently embodied in practice.

In the drawing, wherein like reference characters designate like parts throughout the several views:

Figure 1 is a partially sectioned elevational view of a vacuum type brewer embodying the features and principles of this invention;

Figure 2 is an enlarged sectional view of the upper end portion of a filter member holding unit of the brewer shown in Figure 1;

Figure 3 is a modified form of the upper end portion of the filter holding unit;

Figure 4 is a modified form of the lower end portion of a filter holding unit of the brewer shown in Figure 1; and Figure 5 is a modified form of filter holding unit for a beverage brewer similar to that shown in Figure 1.

Referring now to the drawing, especially to Figures 1 and 2, the vacuum type coffee brewer is shown as including a heating device, or stove 10, preferably one of the well-known electrical stoves having electrical terminals 11 and 12, and being provided with legs 13 and 14 to adapt it to set upon a table or the like. A lower liquid container 15 is provided, preferably of glass, and having a pouring spout 16 at its upper end, or mouth portion 17. A handle 18 may be provided which, in the usual manner, is secured to the mouth portion 17 by means of a strap clamp 19. The lower container 15 is adapted to seat upon the stove 10 whereby the liquid in said container will be heated to the proper temperature.

An upper container 21 having a depending tubular portion 22, also preferably made of glass, is provided. The upper container 21 is adapted to be seated upon the lower container 15 with the tubular portion 22 extending down into the liquid therein and is sealed within the mouth portion 17 thereof by a stopper 23, preferably made of rubber. The lower surface of the upper container 21 may be recessed as at 24, to form a seat for a readily removable filter cloth holding unit comprising a cylindrical member 25 through which a tube 26 is sealed in any well-known manner. If desired, the tube 26 may be made integral with the member 25. A bag, or disk, of filter cloth 27 is disposed about and under the member 25 and, as herein shown, may be tied thereto, at the top, by a string with ends 28 and 29 which may be readily untied when the filter cloth is to be removed for rinsing. The member 25, in this instance, is provided with a plurality of grooves 31, in its lower surface, which communicate through the filter cloth 27 with the upper container 21 and with the tubular downwardly extending portion 22. The member 25 and the filter cloth 27 is of proper diameter to cover the upper end of the tubular portion 22, preferably overlapping its peripheral edges to some extent so as to retain a loose ingredient in the upper container 15.

The tube 26 extends upwardly in the upper container 21 to a point above the possible level of the unconfined ingredients, such as coffee, 32 disposed therein, and above the possible level of liquid forced thereinto by pressure from the lower container 15, when the beverage brewer embodying this invention is in operation. The tube 26 may also extend downwardly into the lower container 15, as shown, to below the lower end of the tubular portion 22. A back-flow check valve structure, herein shown as being constituted by a rubber, or composition, plug 33 adapted to sealingly seat in the bore of the tube 26, and a rod 34 extending downwardly through the tube 26 and terminating in a crossbar 35, spaced below the tube end, is provided to limit the upward movement of the valve plug 33. The said check valve acts to prevent air from entering into the lower bowl 15, as it cools, and thereby permits the formation of a vacuum in said lower bowl for drawing the brew from the upper bowl into the lower bowl through the filter cloth 27 and the tube 22. A spreader cap 36 is provided which is preferably attached to and disposed above the valve plug 33.

It is proposed to so proportion the weight of the combined filter cloth holding and liquid directing unit, comprising the member 25 and the tube 26, in respect to the diameter of the tube 26 that as the water, or other liquid, in the lower container 15 is heated, a determined portion of the same will flow upwardly through the tubular portion 22 and through the filter cloth 27 into the upper container 21 and partially float the loose ingredients, or coffee grounds therein and, as the temperature increases and pressure is developed in the container 15, a determined portion of the liquid therein will be caused to rapidly flow upwardly through the tube 26 to above the ingredients. When the water, under such increased pressure, reaches the plug valve 33 it forces this plug upwardly and then, due to the spreader cap 36, sprays outwardly over the floating loose ingredients causing them to sink and, due to the agitation caused by such spraying, to be more thoroughly mixed with the liquid. It will be understood that the flow of water through the tubular extension 22 will be relatively slow due to the retarding action of the filter cloth 27, which is of determined texture to obtain this result. Due to this retarding action of the filter cloth 27, the pressure in the lower container is caused to rapidly rise to the required predetermined amount and before a substantially large amount of water has passed through the filter cloth 27 so that a substantial quantity of the water remaining in the lower container will be forced upwardly through the tube 26 and spray over the loose ingredients in the upper container 21.

A filter cloth holding and liquid directing unit of the above improved form is simple and inexpensive to make and is adapted for use between the upper and lower containers 21 and 15, respectively, of substantially any vacuum beverage brewer of the nature disclosed, and may be readily removed therefrom, as a unit, for cleaning or replacement. Such a unit is complete in itself and is adapted for the purposes for which it is intended, such as to cause the thorough mixing of the ingredients and the liquid, as well as to properly hold the filter cloth in position to filter the beverage when it flows back into the lower container 15.

If desired, the valve structure may comprise a ball 40 adapted to close the upper end 41 of the tube 26 as in the form shown in Figure 3. In this form the end 41 has a cap 42 screw threaded thereon to confine the ball 40. The cap 42 is provided with openings 43 through which the liquid flows outwardly, to spray over the ingredients in the upper container 21. If desired, a hood-like portion 44 may be provided on the cap 42 to direct the liquid downwardly.

In some instances the flow of liquid through the strainer or filter cloth 27 is found to be too fast and therefore a valve disk 46, see Figure 4, may be disposed at the bottom end 45 of the tubular extension 22 to close this end when the upward flow therethrough becomes too great, and thereby cause more of the upwardly flowing liquid to traverse the tube 26. The disk 46 is mounted to slide upon the tube 26 and is prevented from dropping off the lower end thereof by a sleeve 47 screw threaded onto the lower end of the tube 26.

In the form shown in Figure 5 the filter cloth, or like, holder and liquid directing unit comprises a block 50 having a plurality of perforations 51 therethrough and a tube 52 sealed to this member, or formed integral therewith, and extending upwardly therefrom to above the ingredients in the upper container 53 and downwardly a short distance into the downwardly extending tubular portion 54 of the upper container 53. The tube 52 is of smaller diameter than the tubular portion 54. The block 50 may be retained against the bottom of the container 53 to hold a filter cloth 55 thereagainst by a lightly tensioned spring 56 hooked, at one end, over the lower edge 57 of the tubular portion 54.

A cap valve 58 telescopes over the upper end 54 of the tube 52 and has a sealing washer 60 in its upper end adapted to seat upon this tube end 59 to seal it when the cap 58 is in down position. A wire 61 connected to the cap 58 extends downwardly through the tube 52 and is bent at its lower end to form a crossbar 62 whereby upward movement of the cap 58 is limited.

The cap 58 is provided with a plurality of perforations 63 disposed in spaced relation about its periphery and which are normally covered and closed by the tube end 59 when the cap 58 is in down position. Pressure of the upwardly flowing liquid, from the lower container through the tube 52, raises the cap to position the perforations 63 above the upper edge of the tube 52 and permit the liquid to spray outwardly through the same and over the ingredients in the upper container 53. As in the previously described forms, the tension of the spring 56 is such, that as the liquid is first heated, it rises in the tubular extension 54 and through the filter cloth 55 to float the ingredients and then, as the pressure increases, the liquid will flow up the tube 52, raise the cap 58, and spray over the ingredients to thoroughly mix them with the liquid in the upper container 53.

It will be obvious, from the above, that this invention provides an improved beverage brewer having separable upper and lower containers, a combined filter cloth, or like, holder and liquid directing unit adapted to substantially automatically cause thorough mixing of the liquid and the ingredients in the upper container whereby less ingredients are required and the strength of flavor of the beverages prepared thereby will be uniform. By retarding the upward flow of a determined volume of the water from the lower container through the outer tubular extension 22 by means of the filter cloth 27 and by retarding the flow of water upwardly through the inner tube 26 by the construction of the valve at the upper end of the inner tube, the water remaining in the lower container 15 is rapidly raised in temperature while sufficient pressure is being developed to force it upwardly through the inner tube to actuate the valve to open it. This latter volume of water due to its increased temperature and by being sprayed over the ingredients to thoroughly mix them with the water, greatly facilitates the absorption of the essential oils and flavor from the same, thus greatly improving the efficient action of the beverage brewers of the type described. It is also obvious that the improved filter member holding and liquid directing unit disclosed herein is relatively simple in construction and inexpensive to manufacture, as well as particularly convenient to use, being readily removable as a unit, out of the upper container and the downwardly extending tubular portion thereof, for cleaning and in the preparation of subsequent supplies of beverage.

While there has been shown and described in this specification several forms in which the invention may be embodied, it is to be understood that the invention may be embodied in other forms without departing from the spirit and essential attributes thereof.

What is claimed as new and for which it is desired to secure Letters Patent, is:

1. In a beverage brewer of the character described comprising an upper bowl, a lower bowl, and a hollow stem depending from said upper bowl, the combination of a unit comprising a tubular member extending from a point within said stem to a point above the normal level of ingredients in said upper bowl, a filter member surrounding said tubular member and closing the mouth of said stem, and a cap fitting over the top of said tubular member for closing the same to prevent downward passage of air therethrough; the said cap having openings in the surrounding wall thereof and fitting loosely over said tubular member whereby it will be lifted by upward pressure of liquid in said member and cause the said liquid to be sprayed radially from said member through said openings.

2. For a beverage brewer of the character described, a unit comprising a straight tubular member having an enlarged portion intermediate the ends thereof adapted to retain a filter in position, and a check valve in the upper end of said tubular member comprising a cap loosely fitting said end and having apertures in the annular wall thereof; the bottom of said cap sealing the upper end of said tubular member to prevent back flow therethrough and the said cap being vertically movable, by pressure in said tubular member, whereby the said openings will be located above the end of said tube to provide radially extending openings for said tubular member for radially spraying liquid therefrom.

WALTER S. EDWARDS.